United States Patent [19]
Chang

[11] Patent Number: 5,983,918
[45] Date of Patent: Nov. 16, 1999

[54] BALANCING VALVE ASSEMBLY OF A COLD AND HOT WATER MIXING VALVE

[76] Inventor: Chia-Bo Chang, No. 335, Chang-Ting road, Lukang, Changhua Hsien, Taiwan

[21] Appl. No.: 09/109,005

[22] Filed: Jul. 1, 1998

[51] Int. Cl.[6] .................................................. G05D 11/16
[52] U.S. Cl. ......................... 137/98; 137/100; 137/315; 137/607; 137/625.17
[58] Field of Search .............................. 137/98, 100, 607, 137/315, 625.17

*Primary Examiner*—Stephen M. Hepperle
*Attorney, Agent, or Firm*—Pro-Techtor International Services

[57] ABSTRACT

A balancing valve assembly of a cold and hot water mixing valve including a mixing valve casing having a bottom wall provided with a depression for receiving a balancing valve cover plate. Cold and hot water inlets are provided in the depression, and a balancing valve lower cavity is disposed above the cold and hot water inlets. A balancing valve upper cavity is provided below cold and hot water inlets on the balancing valve cover plate. A washer is disposed between the mixing valve casing and the balancing valve cover plate when coupled so that the balancing valve lower cavity of the casing and the balancing valve upper cavity of the balancing valve cover plate together form a leakage-free space in which a balancing valve body may be secured, thus achieving a structure that is simple and quick to assemble and remains secured alter assembly.

1 Claim, 8 Drawing Sheets

BALANCING VALVE ASSEMBLY OF A COLD AND HOT WATER MIXING VALVE

BACKGROUND OF THE INVENTION (a) Field of the Invention

The present invention relates generally to a balancing valve assembly of a cold and hot water mixing valve, and more particularly to an improved structure in which a cold and hot water control unit is connected to a water pressure balancing valve as an integral whole.

(b) Description of the Prior Art

A conventional water faucet achieves mixing of hot and cold water and flow regulation by utilizing a mixing valve. The mixing valve has two tightly overlapping ceramic disks in which the lower one is fixed while the upper one is movable on the lower disk by means of a control lever. The fixed disk is provided with two inlet openings respectively connected to two divided hot and cold water inlets and an outlet opening for conducting water to the mouth of the faucet. The movable disk is provided with a mixing space where hot and cold water can mix and may selectively connect any one or both of the inlet openings of the fixed disk to the outlet opening.

In use, the conventional mixing valve is directly connected to the water piping. Therefore, when supply of either hot water or cold water is unstable, the water coming out of the faucet will be suddenly cold and suddenly hot. In particular, if the supply of cold water is drastically reduced or even stopped and the supply of hot water is continued, the water coming out of the faucet will be very hot, which may scald the user seriously. In order to correct this defect, the hot and cold water pipes are firstly connected to a balancing valve before they are connected to the mixing valve so that when water pressure in the hot or cold water pipe suddenly changes, the balancing valve will automatically cut off both cold water and hot water supply to ensure safety.

With reference to FIGS. 12 and 13, a balancing valve device generally includes a valve seat 1' and a valve body 2'. The valve seat 1 is internally provided with a chamber 11' provided with cold and hot water inlets 12', 13' and outlets 14', 15'. As shown in FIG. 15, the valve body 2' generally includes a cylindrical sleeve 21' and a stop 22'. The stop 22' is precision-fitted inside the sleeve 21' such that it may freely slide. In addition, the sleeve 21' and the stop 22' are respectively and symmetrically provided with two water holes 211', 212', 221' and 222', with a partition 223' disposed between water holes 221' and 222'. The balancing valve 2' is installed in the chamber 11', and the partition 223' divides the chamber 11' into a cold water flow space and a hot water flow space so that water flowing in from the water inlets 12' and 13' past the water holes 211', 212', 221' and 222' and out through the water outlets 14' and 15'. During the passage of water through the balancing valve device, two end surfaces of the partition 223' of the stop 22' are respectively subjected to water pressure inside the cold and hot water flow spaces. Therefore, when water pressure in the hot or water pipe changes, the partition will be subjected to the action of the side with the greater water pressure so that the entire stop 22' displaces towards the side with the lesser water pressure, resulting in closure of the water holes 211', 212', 221' and 222' and stopping of the flow of hot and cold water (as shown in FIG. 14).

In the past, such balancing valve is independently and externally installed on the hot and cold water pipes before they connect to the water faucet. This is not only unsightly but also makes piping design and pipe laying difficult. Installation and operation thereof are also inconvenient. Although there are efforts to overcome these drawbacks by simplifying the structure, or combining the balancing valve with the mixing valve as shown in FIG. 15. The balancing valve is shown to be reduced and directly provided below the mixing valve to form a structure including a mixing valve casing 3', an upper bottom plate 4' and a lower bottom plate 5'. The casing 3' has installed therein, in sequence, a control lever device 31', a movable disk 32', and a fixed disk 33', a seal 41' fitted to a top side of the upper bottom plate 4' with its lugs 42' fastened to corresponding fastening holes 35' at the bottom side of the casing 3'. In addition, the upper bottom plate 4' is provided with through cold and hot water holes 43' and mixed water hole 44' respectively communicating with cold and hot water holes 331' and mixed water hole 332' of the fixed disk. Besides, a balancing valve upper chamber 45' is provided below the cold and hot water holes 43' of the upper bottom plate 4'. Furthermore, a seal 51' is fitted on a top side of the lower bottom plate 5' which is secured to the bottom side of the upper bottom plate 4' using screws 52'. In addition, the lower bottom plate 5' is likewise provided with through cold and hot water holes 53' and mixed water hole 54' respectively communicating with the cold and hot water holes 43' and mixed water hole 44' of the upper bottom plate. A balancing valve lower chamber 55' is provided above the cold and hot water holes 53' of the lower bottom plate 5' such that the lower chamber 55', together with the upper chamber 45', may sealingly enclose a balancing valve 2' therebetween. After assembly, water from the water pipes flow past the through holes 54' of the lower bottom plate into the communicating spaces divided by the balancing valve 2' and through the through holes 43' of the upper bottom plate to the water holes 331 of the fixed disk and into a mixing chamber 321 of the movable disk. When the mixing chamber 321' and the water holes 332' of the fixed disk are connected, the mixed water flows via the water holes 332' and through holes 44' and 54' into the faucet cavity and out through the faucet opening for use.

Although the above-described structure combining the balancing valve and the mixing valve has solved the problem of unsightliness and the difficulties in piping, installation and operation, it has other problems. For instance, as this structure is comprised of a number of components, the latter must have relatively high precision in order that tightness of the structure after assembly is ensured. And in order to ensure tightness, washers or seals have to be provided between the necessary components, which means difficult and inconvenient assembly. Besides, if any of the components is not properly aligned, it will affect the tightness of the structure. Additionally, since the components are connected by fastening means or screws, it is difficult to ensure that the connections are secure. If any of the connections is loosened, the tightness of the structure will be seriously affected as well. Improvement is therefore necessary.

SUMMARY OF THE INVENTION

A primary object of the present invention is to provide a balancing valve assembly of a cold and hot water mixing valve in which a balancing valve device is directly installed in a mixing valve casing to avoid problems resulting from use of fasteners or screws in assembly.

Another object of the present invention is to provide a balancing valve assembly of a cold and hot water mixing valve in which the components remain firmly intact after assembly to ensure zero leakage.

A further object of the present invention is to provide a balancing valve assembly of a cold and hot water mixing valve in which assembly of the components is made simpler.

Still another object of the present invention is to provide a balancing valve assembly of a cold and hot water mixing valve in which there is no need to enhance the machining precision of the components as in the prior art, which leads to increase in machining cost.

In order to achieve the above-mentioned objects, the present invention comprises a mixing valve casing having a bottom wall provided with a depression in which cold and hot water inlets are provided, a balancing valve lower cavity being provided above the cold and hot water inlets in the depression. A sealing groove is provided in the depression along peripheries of a pre-formed water outlet and the balancing valve lower cavity. There is further provided a balancing valve cover plate shaped to match the depression of the casing. The balancing valve cover plate is correspondingly provided with cold and hot water inlets and a balancing valve upper cavity below the water inlets. The balancing valve cover plate is secured in the depression with the washer fitted in the sealing groove on the bottom wall of the casing such that the balancing lower cavity of the casing and the balancing valve upper cavity of the cover plate together define a leakage-free space in which a balancing valve body may be secured, thereby achieving a structure that is simple and quick to assemble and remains firmly intact after assembly.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
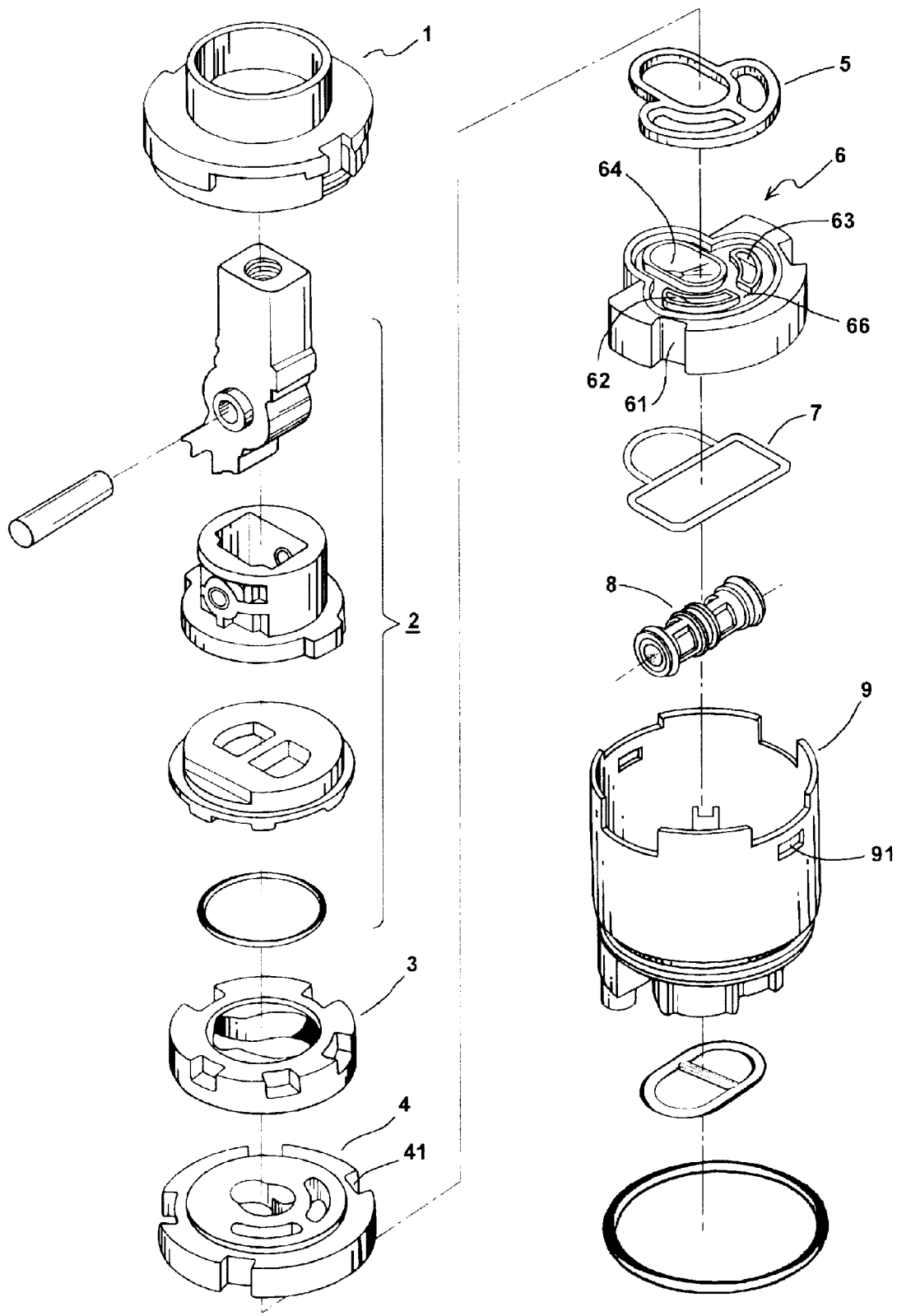
FIG. 1 is a perspective exploded view of the present invention.
Figure 2:
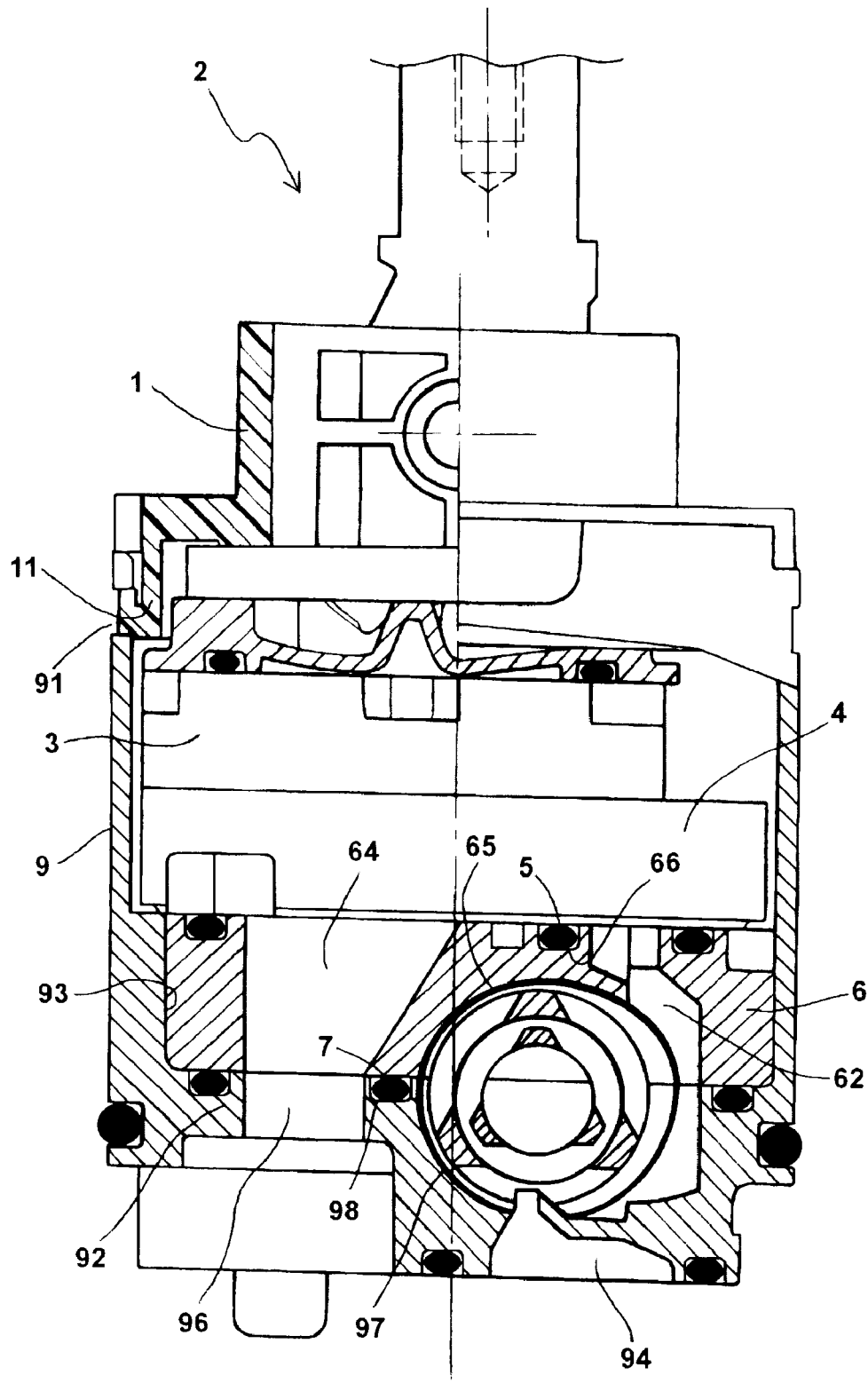
FIG. 2 is a sectional assembled view of the present invention showing the inter-relationship of the components.
Figure 3:
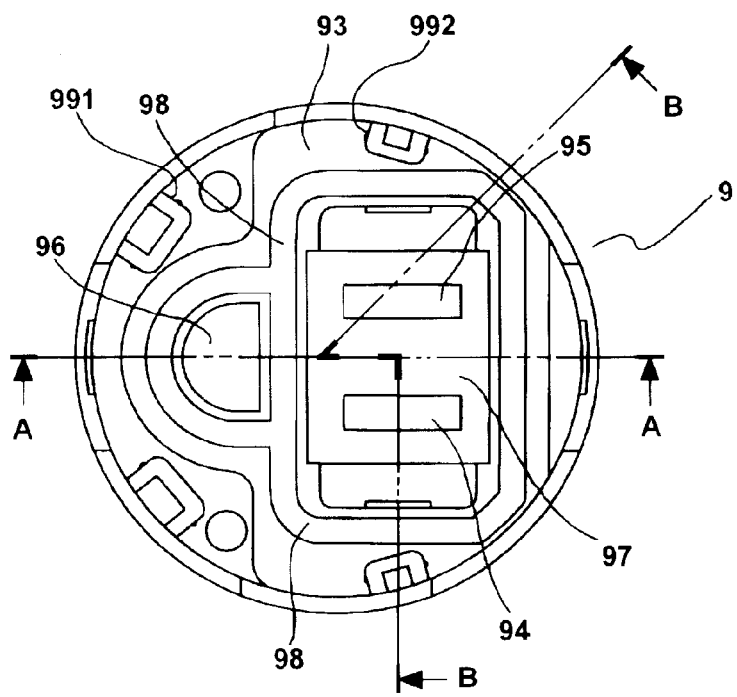
FIG. 3 is a top view of the casing of the present invention.
Figure 4:
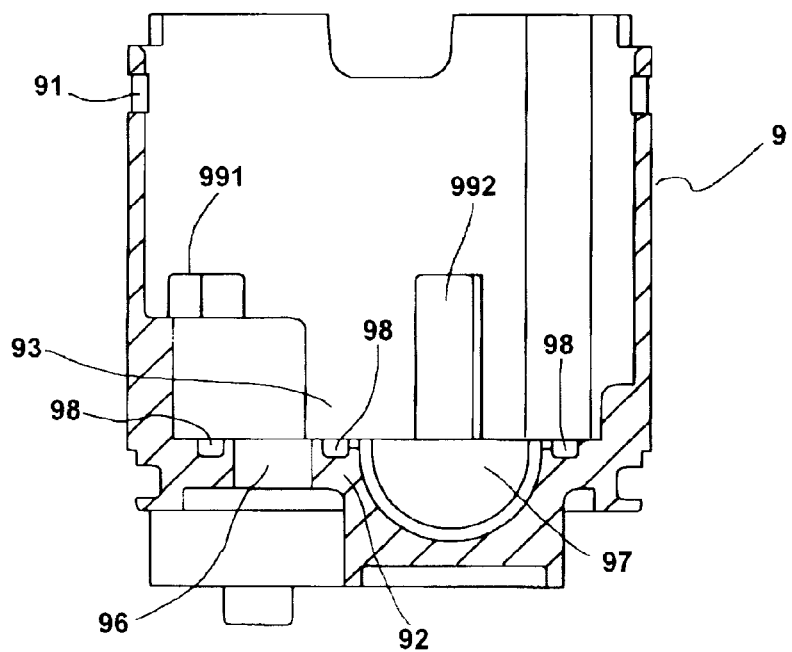
FIG. 4 is a side sectional view taken along line A—A of FIG. 3.
Figure 5:
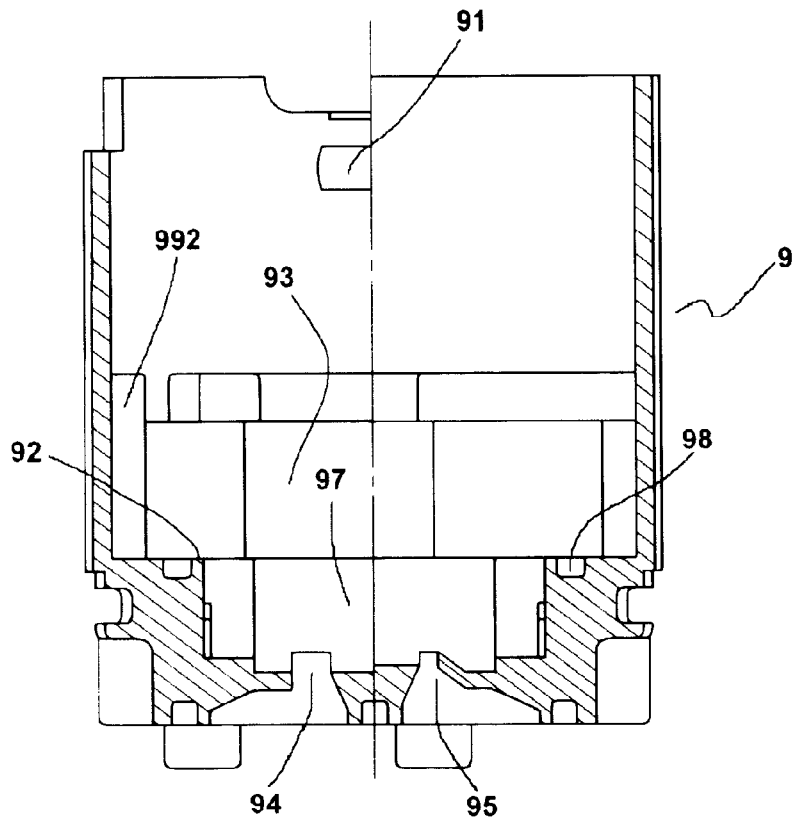
FIG. 5 is a side sectional view taken along line B—B of FIG. 3.
Figure 6:
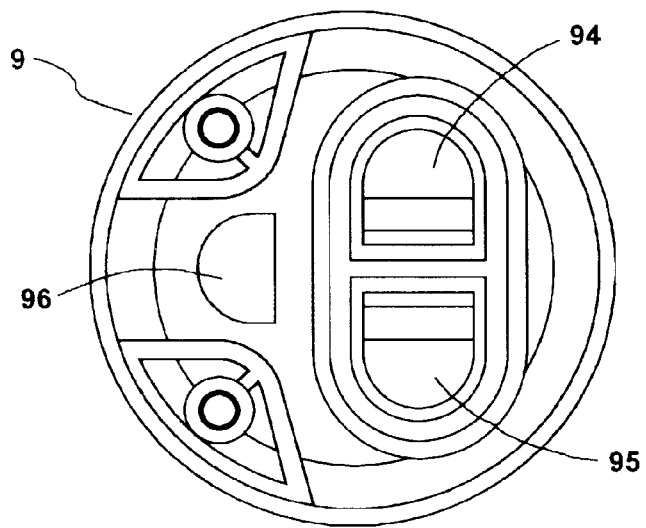
FIG. 6 is a bottom view of the casing of the present invention.
Figure 7:
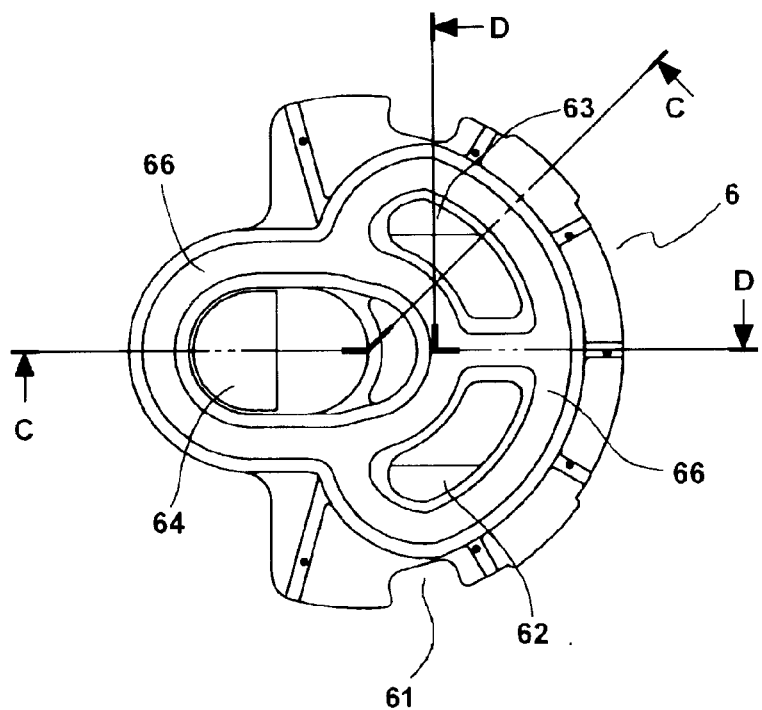
FIG. 7 is a top view of a balancing valve cover plate of the present invention.
Figure 8:
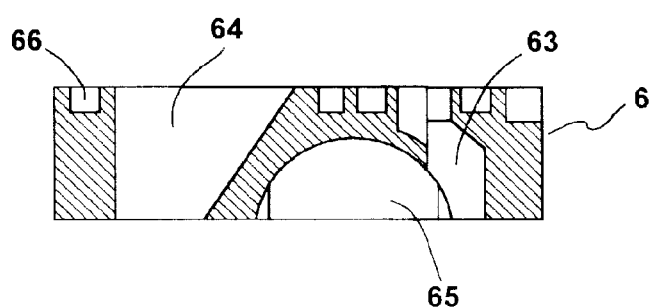
FIG. 8 is a side sectional view taken along line C—C of FIG. 7.
Figure 9:
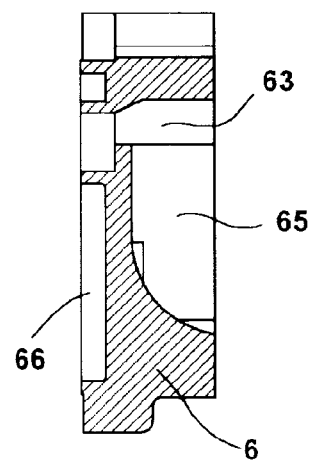
FIG. 9 is a side sectional view taken along line D—D of FIG. 7.
Figure 10:
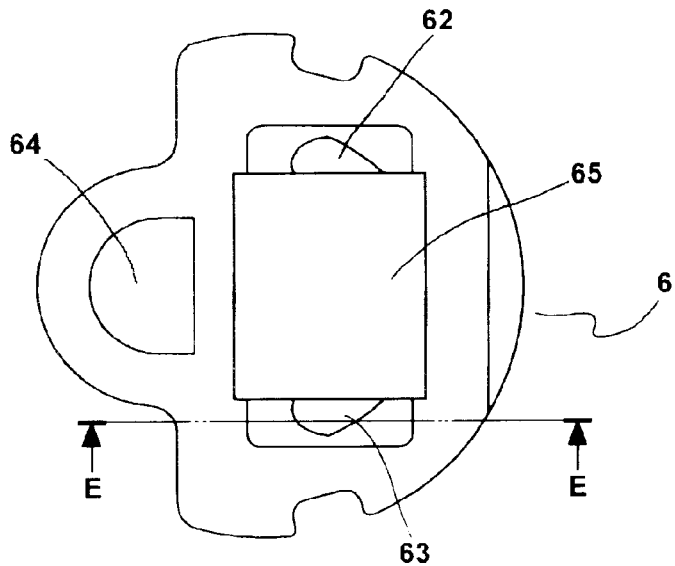
FIG. 10 is a bottom view of the balancing valve cover plate of the present invention.
Figure 11:
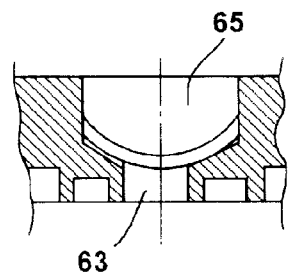
FIG. 11 is a partially sectional view taken along line E—E of FIG. 10.
Figure 12:
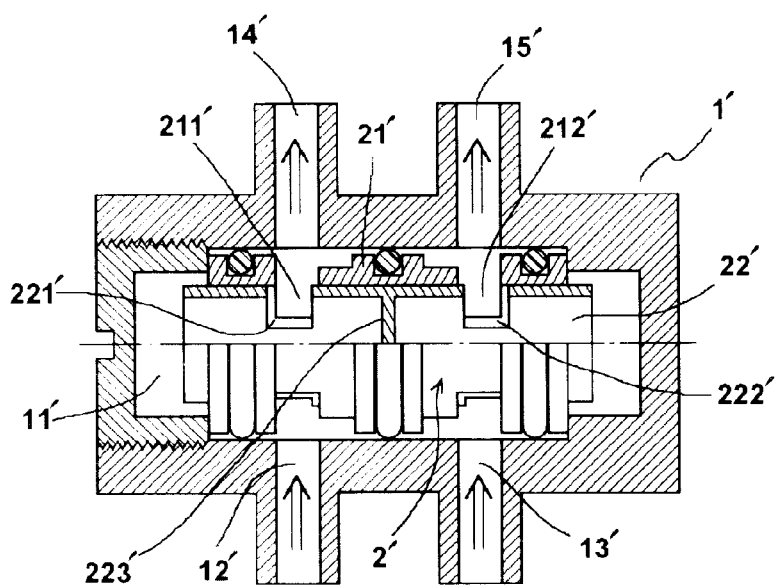
FIG. 12 is a sectional view of a conventional balancing valve.
Figure 13:
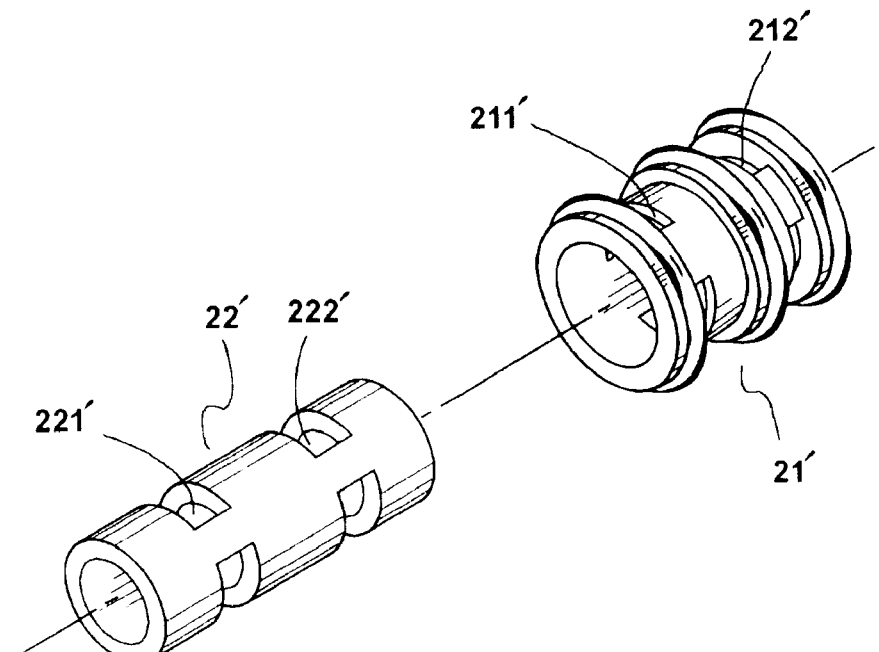
FIG. 13 is a perspective exploded view of the balancing valve in FIG. 12.
Figure 14:
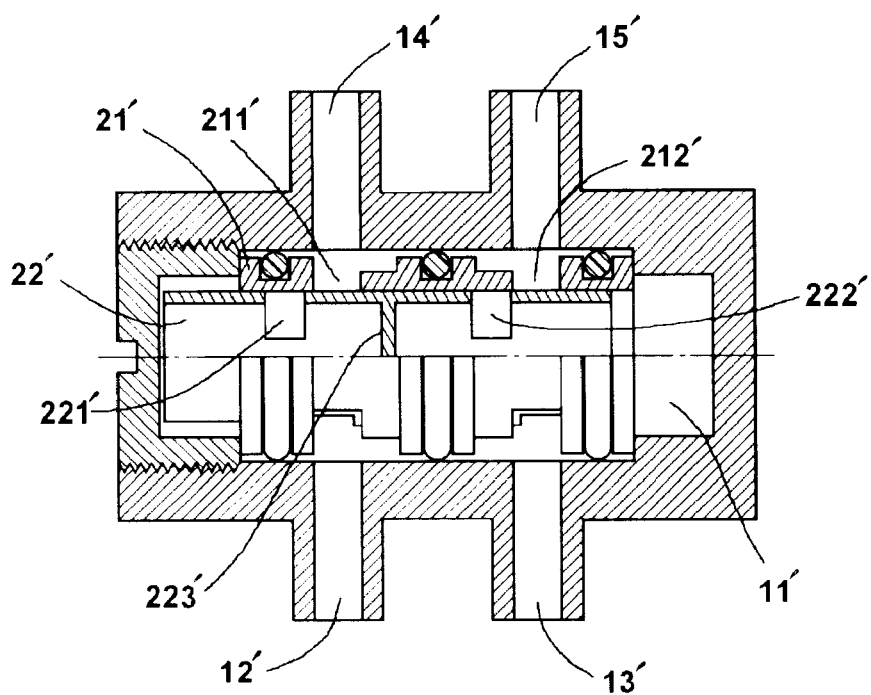
FIG. 14 is a sectional view of the balancing valve in FIG. 12 in a state of stopping water flow.
Figure 15:
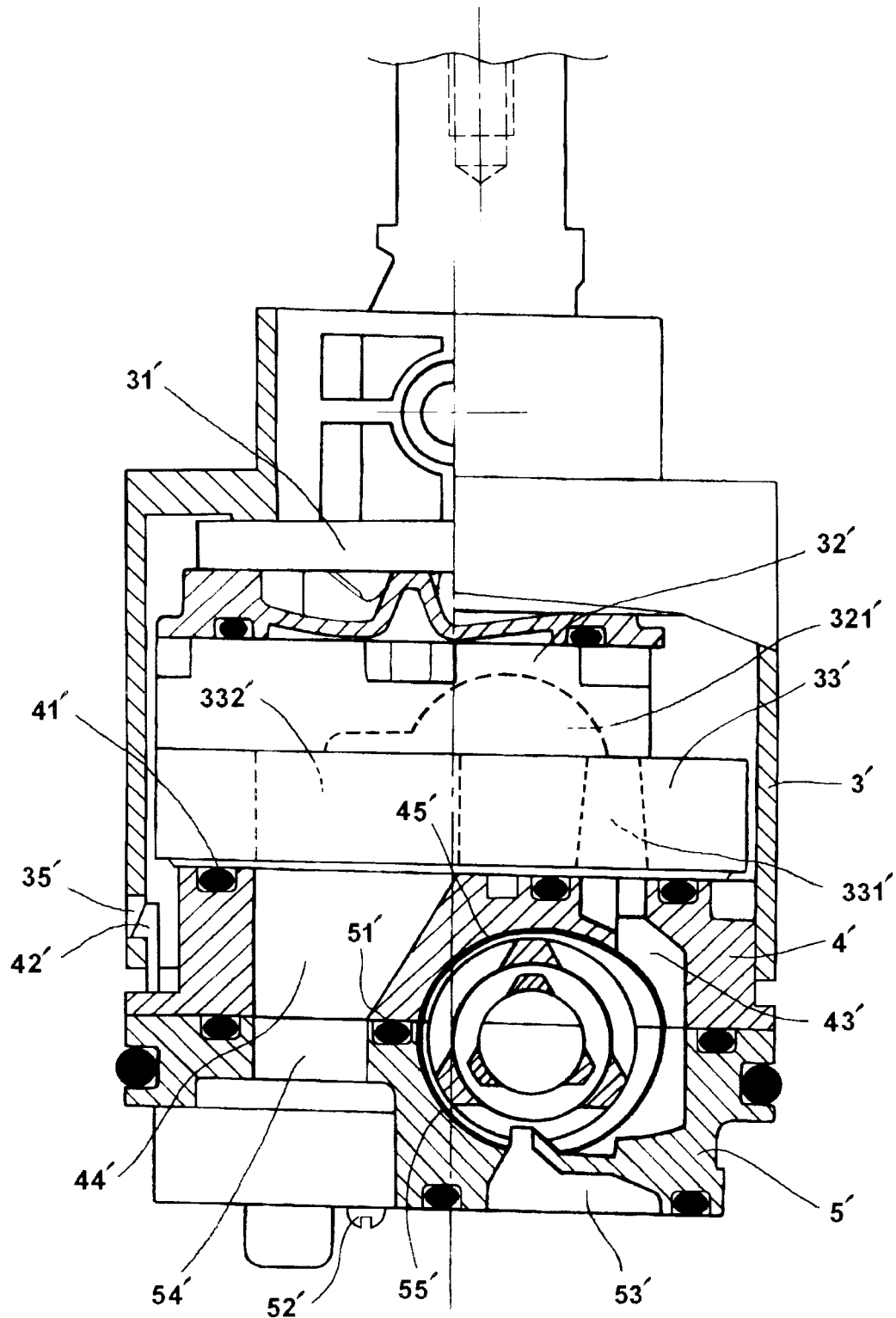
FIG. 15 is a sectional view of a cold and hot water mixing valve having a balancing valve.

As shown in FIGS. 1 and 2, the present invention comprises a casing cover 1, a rocker control device 2 comprising a rocker, a rocker mount, a connecting element and a washer, a movable disk 3, a fixed disk 4, a disk seal 5, a balancing valve cover plate 6, balancing valve seals 7, a balancing valve body 8 and a casing 9. With reference to FIGS. 3–7 as well, the casing 9 is shown to have fastening holes 91 at an upper rim thereof for fastening hooks 11 on the casing cover 1. A bottom wall 92 of the casing has an upper surface provided with a depression having a smaller rounded portion connected to a larger rounded portion. Through cold and hot water inlets 94, 95 and mixed water outlets 96 are provided on the bottom wall 92 in the area of the depression 93. A balancing valve lower cavity 97 is disposed above the cold and hot water holes 94 and 95. In addition, in the depression 93 along the rims of the water outlet 96 and the balancing valve lower cavity 97 are provided sealing grooves 98. Guide rails 991, 992 are provided to extend upwardly from the bottom wall 92 and the depression 93 on the surrounding wall of the casing. Referring to FIGS. 8–12, the balancing valve cover plate 6 has a shape matching that of the depression 93 of the casing and is provided with a peripheral guide groove 61 corresponding tot he guide rail 992 of the casing so that the balancing valve cover plate 6 may be fitted and secured in the depression 93. The balancing valve cover plate 6 is also provided with through cold and water inlets 62, 63 and mixed water outlets 65 corresponding to those of the casing 9, and a balancing valve upper cavity 65 is disposed below the cold and hot water inlets 62, 63. In addition, on the upper surface of the balancing valve cover plate 6 along the rims of the above-mentioned through holes 62, 63 and 64 but spaced suitably apart therefrom are provided sealing grooves 66.

In assembly, the above-mentioned components are assembled from the top to the bottom wherein when the balancing valve cover plate 6 is fitted and secured in the depression 93, by placing the balancing valve seals 7 in the sealing grooves 98, the balancing valve lower cavity 97 of the casing 9 and the balancing valve upper cavity 65 of the balancing valve cover plate 6 together define a leakage-free space in which the balancing valve body 8 may be secured. Furthermore, after the disk seal 5 has been fitted into the sealing groove 66 of the balancing valve cover plate 6. The fixed disk 4 utilizes a guide groove 41 thereof to cooperate with the guide rail 991 of the casing so that it may be fitted into the casing to press against the disk seal 5. The movable disk 3 is sealingly secured on the fixed disk 4 with an upper end surface disposed below the rocker control device 2, which in turn utilizes its rocker mount to secure on the casing cover 1. The casing cover 1 is lastly fastened to the upper end of the casing 9 to accomplish the assembly of the present invention.

It can be appreciated from the above that the present invention is simple in construction as well as in operation and assembly, and after assembly, the present invention will remain secured, thereby overcoming all the problems of the prior art.

Although the present invention has been illustrated and described with reference to the preferred embodiment thereof, it should be understood that it is in no way limited to the details of such embodiment but is capable of numerous modifications within the scope of the appended claims.

What is claimed is:

1. A balancing valve assembly of a cold and hot water mixing valve, comprising a casing cover, a rocker control device including a rocker, a rocker mount, a connecting element and a washer, a movable disk, a fixed disk, a disk seal, a balancing valve cover plate, balancing valve seals, a balancing valve body, and a casing, all of which are assembled in the order of from top to bottom, wherein said casing has a bottom wall having an upper surface provided with a depression, through cold and hot water inlets and mixed water outlet being formed on said bottom wall within an area covered by said depression, a balancing valve lower cavity being provided above said cold and hot water inlets, sealing grooves being provided in said depression along peripheries of said water outlet and said balancing valve lower cavity, said balancing valve cover plate having a shape matching that of said depression of said casing and provided with through cold and hot water inlets and mixed water outlet corresponding to those of said bottom wall of said casing, a balancing valve upper cavity being provided below said cold and hot water inlets of said balancing valve cover plate, sealing grooves being likewise provided on an upper surface of said balancing valve cover plate along peripheries of said through water holes and spaced suitably apart therefrom, whereby, during assembly, said balancing cover plate is secured in said depression of said casing and said balancing valve seal is placed in said sealing grooves on said bottom wall of said casing, said balancing valve lower cavity of said casing and said balancing upper cavity of said cover plate commonly define a leakage-free space in which said balancing valve may be secured.

* * * * *